US006823233B2

(12) United States Patent
Matsumoto et al.

(10) Patent No.: US 6,823,233 B2
(45) Date of Patent: Nov. 23, 2004

(54) NUMERICAL CONTROLLING UNIT

(75) Inventors: Ichiro Matsumoto, Numazu (JP); Jun Fujita, Mishima (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 10/151,016

(22) Filed: May 21, 2002

(65) Prior Publication Data

US 2002/0173873 A1 Nov. 21, 2002

(30) Foreign Application Priority Data

May 21, 2001 (JP) ........................................ 2001-150941

(51) Int. Cl.$^7$ .............................................. G06F 19/00
(52) U.S. Cl. ...................... 700/188; 318/90; 700/170; 700/188; 700/280; 702/56
(58) Field of Search .......................... 318/90, 119, 114; 700/170, 188, 280, 38, 64, 151; 702/56, 191; 324/125; 226/10; 73/570, 584

(56) References Cited

U.S. PATENT DOCUMENTS 5,675,496 A * 10/1997 Itoh ........................... 700/188
6,294,891 B1 * 9/2001 McConnell et al. ........ 318/619
6,628,576 B1 * 9/2003 Watanabe et al. ........ 369/30.17

OTHER PUBLICATIONS

Hattori et al., "Suppression Control Method for torque Vibration of Brushless DC Motor Utilizing Repetitive Control with Fourier Transform", Mar. 2000, IEEE, pp. 427–432.*
Hattori et al., "Vibration Suppression Control Method for PMSM Utilizing Repetitive Control with Auto–tuning Function and Fourier Tranform", Sep. 2001, The 27th Annual Conference of the IEEE Industrial Electronics Society, pp. 1673–1679.*

* cited by examiner

Primary Examiner—Leo Picard
Assistant Examiner—Carlos R. Ortiz Rodriguez
(74) Attorney, Agent, or Firm—Pillsbury Winthrop LLP

(57) ABSTRACT

A numerical controlling unit that accelerates or decelerates a feeder-driving system includes; an acceleration setting part that can set a volume and a timing of an acceleration that should be supplied to the feeder-driving system, based on a predetermined target condition; and a controlling part that can supply the acceleration set by the acceleration setting part to the feeder-driving system. The acceleration setting part is adapted to set: a first acceleration that starts to be supplied at a timing of starting to accelerate; and a second acceleration that has a volume and that starts to be supplied overlappedly with the first acceleration at a timing, the volume and the timing being determined so as to damp vibration of the feeder-driving system that is generated by starting to supply the first acceleration.

8 Claims, 5 Drawing Sheets

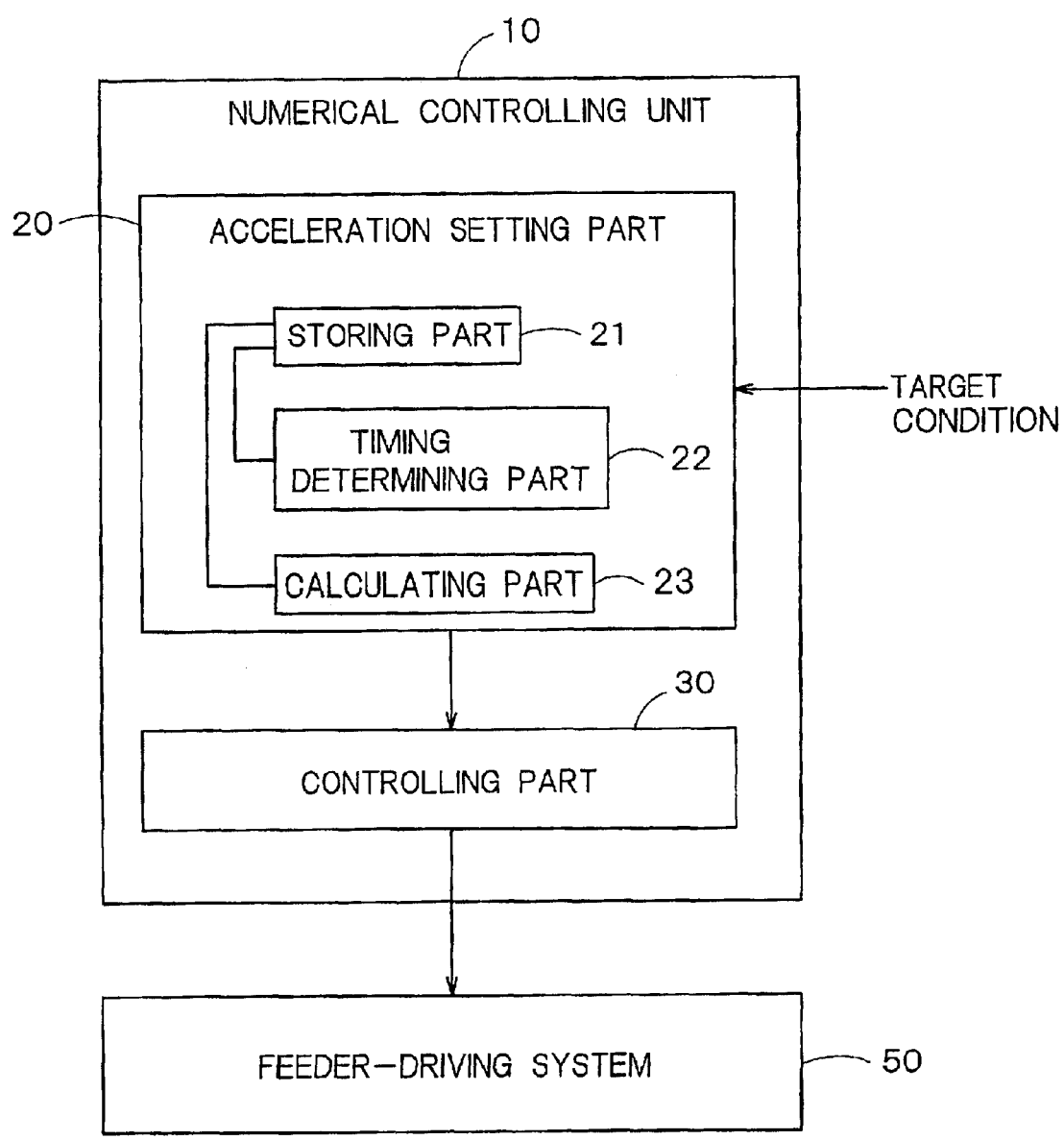
F I G. 1

( WAVEFORM OF VELOCITY )

( WAVEFORM OF ACCELERATION )

( WAVEFORM OF VIBRATION )

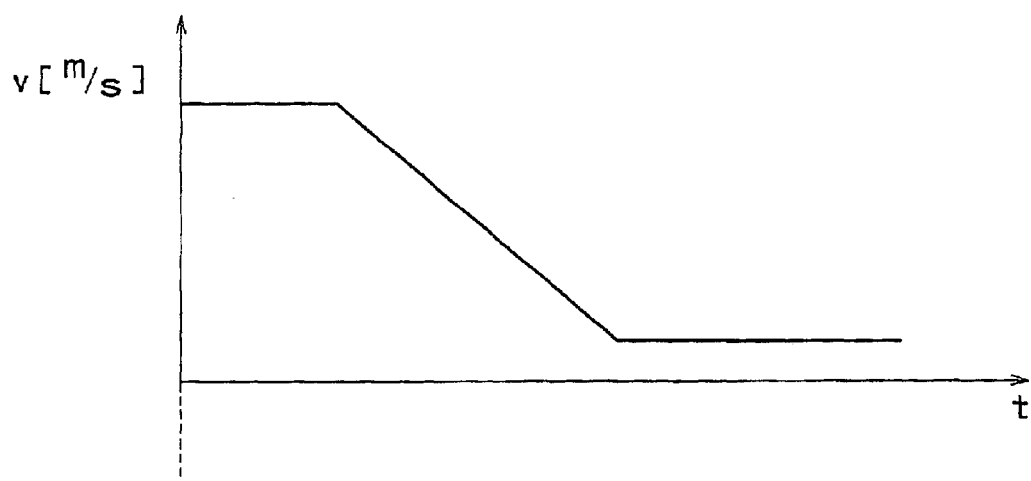
(WAVEFORM OF VELOCITY)
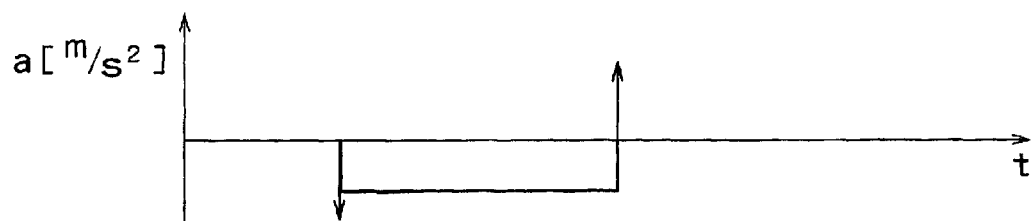
(WAVEFORM OF ACCELERATION)
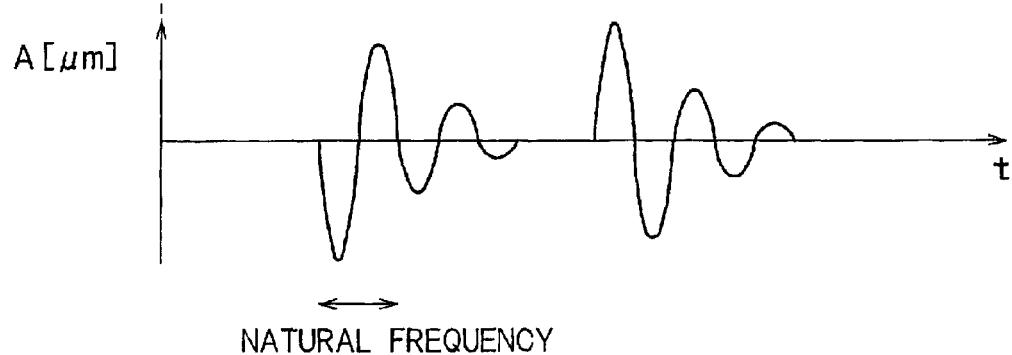
(WAVEFORM OF VIBRATION)
NATURAL FREQUENCY
F I G. 5

NUMERICAL CONTROLLING UNIT

BACKGROUND OF THE INVENTION

1. Field of the Invention

This invention relates to a numerical controlling unit that accelerates and/or decelerates a feeder-driving system.

2. Description of the Related Art

In general, vibration is generated while a feeder-driving system in a machining tool or the like is accelerated or decelerated. This is caused by generation of a vibrating (exciting) force when supply of an acceleration is started or stopped.

During a machining operation to a metallic work or the like, the vibration may greatly affect precision of the machined surface. Thus, it is necessary that the vibration be controlled within a predetermined permissible range. Thus, the value of an acceleration itself is set lower. This means that a time necessary for the machining operation may not be shortened.

In addition, if an accelerating step and a decelerating step are repeated in the machining operation, it is possible that the vibration is not damped down but continues for a longer time. This may be caused by that a subsequent vibration is generated by a subsequent acceleration controlling step before a (previous) vibration generated by a (previous) acceleration controlling step is damped down. In the conventional numerical controlling unit, it is just an accident whether a vibration is increased or reduced by successive acceleration controlling steps.

On the other hand, as means for controlling the vibration, there are known various types of vibration-damping units. The vibration-damping units can damp the vibration by generating another vibrating force in a direction effective for damping the vibration.

Regarding a machining operation to a metallic work or the like, in order to shorten a machining time, it is necessary to effectively damp vibration that may be generated by supply of an acceleration. If vibration at each acceleration controlling step is effectively damped, the possibility that the vibration is increased may be remarkably reduced, even when there are successive acceleration controlling steps.

The above subject can be solved by attaching a known vibration-damping unit to the numerical controlling unit. However, the vibration-damping unit and the numerical controlling unit are not united completely, and thus there are problems of setting-up-space and of cost.

SUMMARY OF THE INVENTION

Therefore, the object of this invention is to provide a numerical controlling unit that can effectively damp vibration that may be generated when a feeder-driving system in a machining tool or the like is accelerated or decelerated.

To achieve the above object, this invention is characterized by following features. That is, this invention is a numerical controlling unit that accelerates or decelerates a feeder-driving system comprising: an acceleration setting part that can set a volume and a timing of an acceleration that should be supplied to the feeder-driving system, based on a predetermined target condition; and a controlling part that can supply the acceleration set by the acceleration setting part to the feeder-driving system; wherein the acceleration setting part is adapted to set: a first acceleration that starts to be supplied at a timing of starting to accelerate; and a second acceleration (whose direction is the same as the first acceleration) that has a volume and that starts to be supplied overlappedly with the first acceleration at a timing, the volume and the timing being determined so as to damp vibration of the feeder-driving system that is generated by starting to supply the first acceleration.

According to the feature, the first acceleration and the second acceleration are paired with each other, so that the second acceleration having the volume starts to be supplied at the timing in order to damp the vibration of the feeder-driving system that is generated by starting to supply the first acceleration. That is, the vibration caused by a vibrating force accompanied with starting to supply the first acceleration is canceled out by another vibration caused by another vibrating force accompanied with starting to supply the second acceleration. Thus, the vibration is effectively damped down when starting to accelerate the feeder-driving system based on the predetermined target condition.

In detail, the timing at which the second acceleration starts to be supplied is a moment wherein an amplitude of the vibration of the feeder-driving system is lowered to zero. At that time, the vibration accompanied with starting to supply the first acceleration and the vibration accompanied with starting to supply the second acceleration are summed up in a relationship of opposite phase, so that amplitudes of the two vibrations are canceled out by each other.

In order to immediately damp down the vibration caused by a vibrating force accompanied with starting to supply the first acceleration, it is preferable that the second acceleration starts to be supplied at a moment wherein an amplitude of the vibration of the feeder-driving system returns to zero at first.

In addition, theoretically, the volume of the second acceleration is the same as the volume of the first acceleration. However, the vibration caused by a vibrating force accompanied with starting to supply the first acceleration may be slightly damped down even for half of a period thereof. If such a slightly damped volume is taken into consideration, it is preferable that the volume of the second acceleration is smaller than the volume of the first acceleration by the slightly damped volume.

In addition, in general, the vibration of the feeder-driving system may be generated based on a natural frequency of the feeder-driving system. That is, the timing at which the second acceleration starts to be supplied is dependent on the natural frequency of the feeder-driving system.

Thus, for example, the acceleration setting part has a storing part that can store a natural frequency of the feeder-driving system, and a timing determining part that can determine the timing at which the second acceleration starts to be supplied based on the natural frequency of the feeder-driving system.

In the case, it is preferable that the natural frequency of the feeder-driving system is precisely measured in advance and that the measured frequency is stored in the storing part.

Alternatively, the natural frequency of the feeder-driving system can be obtained via a theoretical calculation using rigidity of the feeder-driving system and a feeder-part (movable-part) weight of the feeder-driving system.

Thus, for example, the acceleration setting part may further have a calculating part that can calculate the natural frequency of the feeder-driving system based on the rigidity of the feeder-driving system and the feeder-part weight of the feeder-driving system.

In the case, the natural frequency of the feeder-driving system obtained by the calculating part is stored in the storing part.

In fact, one feeder-driving system that is to be controlled by one numerical controlling unit may often have a plurality of axes. In such a case, it is more effective that the invention is applied to an axis having the lowest natural frequency.

The idea of supplying paired two accelerations to damp down the vibration as described above is effective when ceasing to accelerate the feeder-driving system.

That is, it is preferable that the acceleration setting part is adapted to further set: a fourth acceleration (whose direction is opposite to the first acceleration and the second acceleration) that starts to be supplied at a timing of ceasing to accelerate; and a third acceleration (whose direction is opposite to the first acceleration and the second acceleration) that has a volume and that starts to be supplied at a timing before supplying the fourth acceleration, the volume and the timing being determined so as to generate vibration of the feeder-driving system that can be damped by starting to supply the fourth acceleration overlappedly with the third acceleration.

According to the feature, the third acceleration and the fourth acceleration are paired with each other, so that the third acceleration having the volume starts to be supplied at the timing in order to generate the vibration of the feeder-driving system that can be damped by starting to supply the fourth acceleration overlappedly with the third acceleration. That is, the vibration caused by a vibrating force accompanied with starting to supply the third acceleration is canceled out by another vibration caused by another vibrating force accompanied with starting to supply the fourth acceleration. Thus, the vibration is effectively damped down when ceasing to accelerate the feeder-driving system based on the predetermined target condition.

Similarly, the idea of supplying paired two accelerations to damp down the vibration is effective when starting to decelerate the feeder-driving system as well.

That is, this invention is a numerical controlling unit that accelerates or decelerates a feeder-driving system comprising: an acceleration setting part that can set a volume and a timing of an acceleration that should be supplied to the feeder-driving system, based on a predetermined target condition; and a controlling part that can supply the acceleration set by the acceleration setting part to the feeder-driving system; wherein the acceleration setting part is adapted to set: a first acceleration that starts to be supplied at a timing of starting to decelerate; and a second acceleration that has a volume and that starts to be supplied overlappedly with the first acceleration at a timing, the volume and the timing being determined so as to damp vibration of the feeder-driving system that is generated by starting to supply the first acceleration.

According to the feature, the first acceleration and the second acceleration are paired with each other, so that the second acceleration having the volume starts to be supplied at the timing in order to damp the vibration of the feeder-driving system that is generated by starting to supply the first acceleration. That is, the vibration caused by a vibrating force accompanied with starting to supply the first acceleration is canceled out by another vibration caused by another vibrating force accompanied with starting to supply the second acceleration. Thus, the vibration is effectively damped down when starting to decelerate the feeder-driving system based on the predetermined target condition.

In addition, the idea of supplying paired two accelerations to damp down the vibration is effective when ceasing to decelerate the feeder-driving system as well.

That is, it is preferable that the acceleration setting part is adapted to further set: a fourth acceleration (whose direction is opposite to the first acceleration and the second acceleration) that starts to be supplied at a timing of ceasing to decelerate; and a third acceleration (whose direction is opposite to the first acceleration and the second acceleration) that has a volume and that starts to be supplied at a timing before supplying the fourth acceleration, the volume and the timing being determined so as to generate vibration of the feeder-driving system that can be damped by starting to supply the fourth acceleration overlappedly with the third acceleration.

According to the feature, the third acceleration and the fourth acceleration are paired with each other, so that the third acceleration having the volume starts to be supplied at the timing in order to generate the vibration of the feeder-driving system that can be damped by starting to supply the fourth acceleration overlappedly with the third acceleration. That is, the vibration caused by a vibrating force accompanied with starting to supply the third acceleration is canceled out by another vibration caused by another vibrating force accompanied with starting to supply the fourth acceleration. Thus, the vibration is effectively damped down when ceasing to decelerate the feeder-driving system based on the predetermined target condition.

BRIEF DESCRIPTION OF THE DRAWINGS

FIG. 1 is a schematic block diagram of a numerical controlling unit according to a first embodiment of the invention; FIG. 5 shows a waveform of velocity, a waveform of acceleration and a waveform of vibration of a feeder-driving system that is decelerated based on a conventional one-step uniform-acceleration control.

BEST MODE FOR CARRYING OUT THE INVENTION

Embodiments of the invention are explained in more detail with reference to the drawings.

FIG. 1 is a schematic block diagram of a numerical controlling unit according to a first embodiment of the invention. As shown in FIG. 1, the numerical controlling unit 10 of the first embodiment is connected to a feeder-driving system 50 that is an object to be controlled.

As shown in FIG. 1, the numerical controlling unit 10 includes: an acceleration setting part 20 that can set a volume and a timing of each acceleration that should be supplied to the feeder-driving system 50, based on a predetermined target condition; and a controlling part 30 that can supply each acceleration set by the acceleration setting part 20 to the feeder-driving system 50.

In this case, the predetermined target condition is a time for which an acceleration-controlling operation is conducted and a velocity after the acceleration-controlling operation is completed. As described below, the feeder-driving system 50 of the embodiment is accelerated according to three steps of uniform acceleration.

Figure 2:
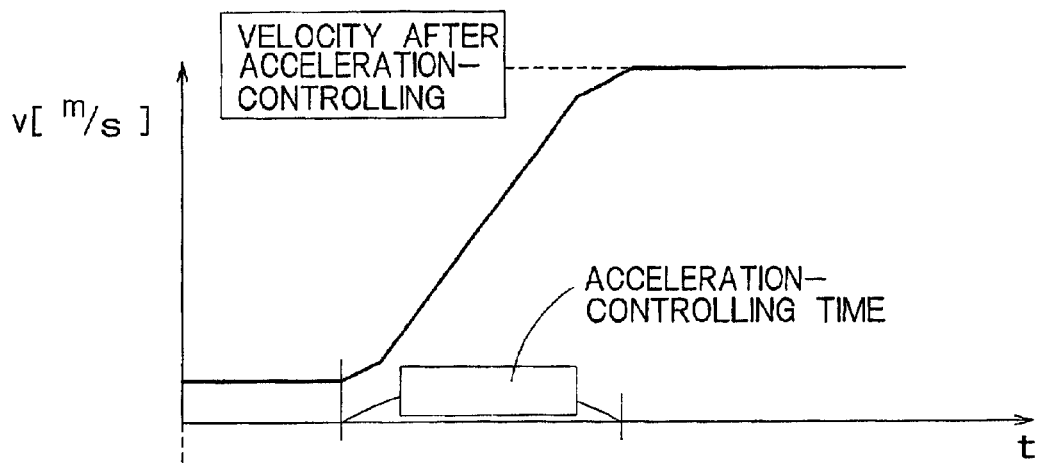
FIG. 2 shows a waveform of velocity, a waveform of acceleration and a waveform of vibration of a feeder-driving system that is accelerated by the numerical controlling unit shown in FIG. 1.
Figure 2:
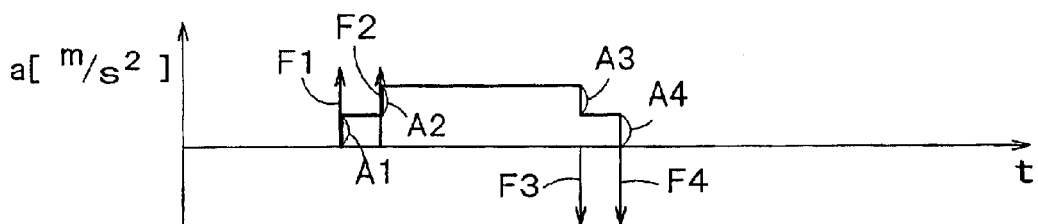
Figure 2:
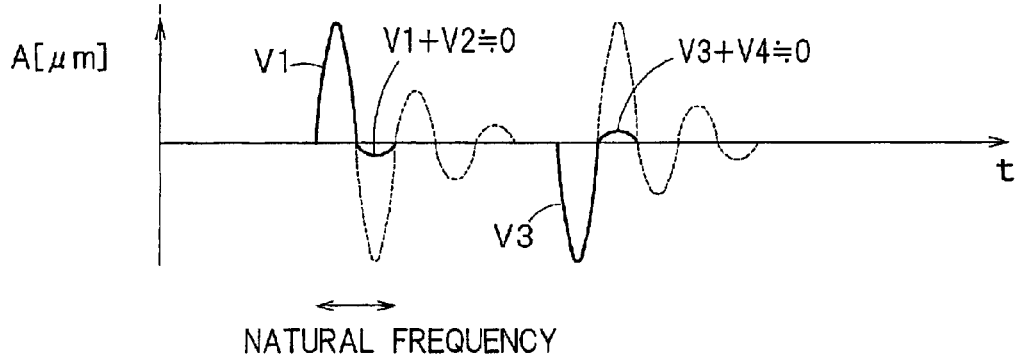

As shown in FIG. 2, the acceleration setting part 20 is adapted to set: a first acceleration A1 that starts to be supplied at a timing of starting to accelerate; and a second acceleration A2 that has a volume and that starts to be supplied overlappedly with the first acceleration A1 at a timing, the volume and the timing being determined so as to damp vibration V1 of the feeder-driving system 50 that is generated by starting to supply the first acceleration A1.

The timing at which the second acceleration A2 starts to be supplied, which is set by the acceleration setting part 20, is a moment wherein an amplitude of the vibration V1 of the feeder-driving system 50 generated by starting to supply the first acceleration A1 is lowered and returns to zero at first. In addition, the volume of the second acceleration A2 is smaller than that of the first acceleration A1 by a slight volume, by taking into consideration being damped for a half of a period of the vibration V1.

Herein, the vibration of the feeder-driving system 50 is generated based on a natural frequency of the feeder-driving system 50. Thus, the acceleration setting part 20 has: a storing part 21 that can store a natural frequency of the feeder-driving system 50; and a timing determining part 22 that can determine the timing at which the second acceleration starts to be supplied, based on the natural frequency of the feeder-driving system 50.

In addition, the acceleration setting part 20 has a calculating part 23 that can calculate the natural frequency of the feeder-driving system 50 based on the rigidity of the feeder-driving system 50 and the feeder-part weight of the feeder-driving system 50.

In addition, the acceleration setting part 20 is adapted to further set: a fourth acceleration A4 (whose direction is opposite to the first acceleration A1 and the second acceleration A2) that starts to be supplied at a timing of ceasing to accelerate; and a third acceleration A3 (whose direction is opposite to the first acceleration A1 and the second acceleration A2) that has a volume and that starts to be supplied at a timing before supplying the fourth acceleration A4, the volume and the timing being determined so as to generate vibration V3 of the feeder-driving system 50 that can be damped by vibration V4 of the feeder-driving system 50 generated by starting to supply the fourth acceleration A4 overlappedly with the third acceleration A3.

Herein, the timing at which the fourth acceleration A4 starts to be supplied, which is set by the acceleration setting part 20, is a moment wherein an amplitude of the vibration V3 of the feeder-driving system 50 caused by starting to supply the third acceleration A3 is raised and returns to zero at first.

That is, the timing determining part 22 is also adapted to determine a timing at which the third acceleration A3 starts to be supplied, based on the natural frequency of the feeder-driving system 50.

In addition, the volume of the fourth acceleration A4 is smaller than that of the third acceleration A3 by a slight volume, by taking into consideration being damped for a half of a period of the vibration V3.

Figure 3:
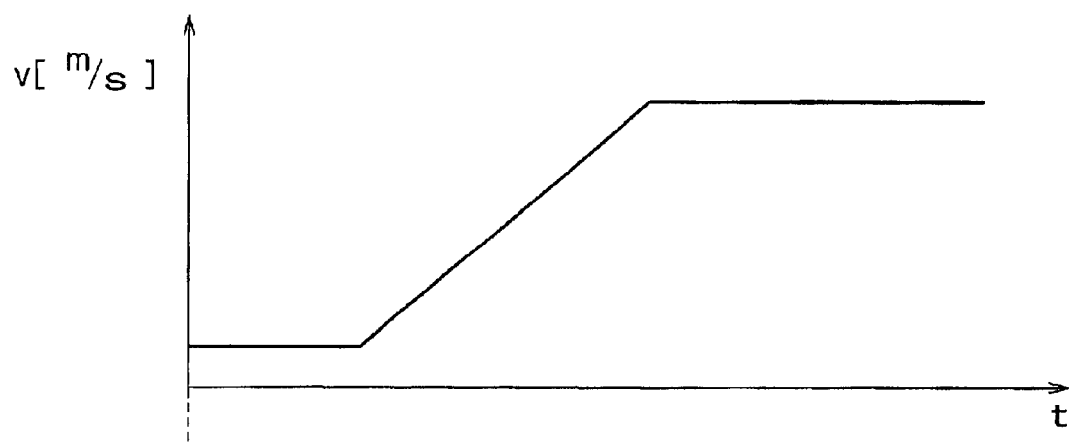
FIG. 3 shows a waveform of velocity, a waveform of acceleration and a waveform of vibration of a feeder-driving system that is accelerated based on a conventional one-step uniform-acceleration control.
Figure 3:
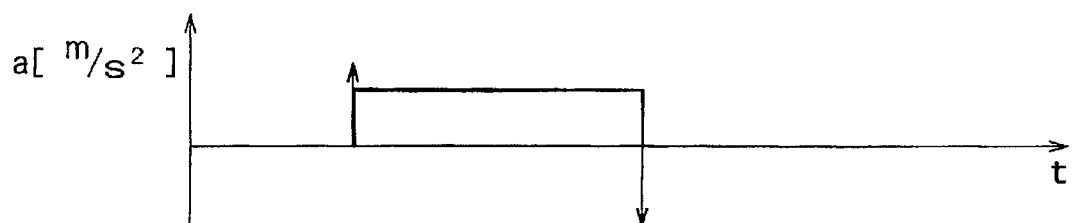
Figure 3:
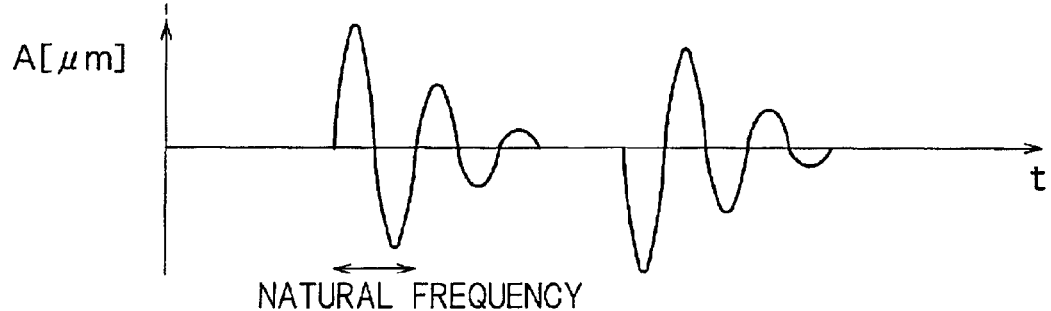

Then, an operation of the embodiment is explained with reference to FIGS. 2 and 3. FIG. 2 shows a waveform of velocity, a waveform of acceleration and a waveform of vibration of the feeder-driving system 50 that is accelerated by the numerical controlling unit 10 shown in FIG. 1. For a purpose of comparison, FIG. 3 shows a waveform of velocity, a waveform of acceleration and a waveform of vibration of the feeder-driving system 50 that is accelerated based on a conventional one-step uniform-acceleration control.

At first, before conducting an acceleration or deceleration controlling operation, a natural frequency of the feeder-driving system 50 is obtained and stored in the storing part 21. The natural frequency may be obtained by a calculation or by an actual measurement.

Then, the timing determining part 22 determines respective timings at which the respective accelerations A1 to A4 start to be supplied, based on the time for which the acceleration-controlling operation is conducted, which is a predetermined target condition, and based on the obtained natural frequency of the feeder-driving system 50.

In addition, the acceleration setting part 20 sets respective volumes of the respective accelerations A1 to A4, based on the velocity after the acceleration-controlling operation is completed, which is a predetermined target condition, and/or based on another condition.

After that, the accelerations set by the acceleration setting part 20 are supplied to the feeder-driving system 50 by the controlling part 30.

In detail, as shown in FIG. 2, when starting to accelerate the feeder-driving system 50, the first acceleration A1 is supplied (first uniform-acceleration step). At that time, a vibrating force F1 is generated, so that the vibration V1 is caused by the vibrating force F1.

At the moment wherein an amplitude of the vibration V1 of the feeder-driving system 50 generated by starting to supply the first acceleration A1 is lowered and returns to zero at first, the second acceleration A2 starts to be supplied. The second acceleration A2 is supplied overlappedly with the first acceleration A1. At that time, a vibrating force F2 is generated, so that the vibration V2 is caused by the vibrating force F2.

As the second acceleration A2 is supplied, the vibration V1 accompanied with starting to supply the first acceleration A1 and the vibration V2 accompanied with starting to supply the second acceleration A2 are summed up in a relationship of opposite phase, so that amplitudes of the two vibrations are canceled out by each other. That is, a very effective vibration-damping effect can be achieved by a relationship of $(V1+V2 \approx 0)$.

After the second acceleration A2 has started to be supplied, a uniform-acceleration controlling operation of the first acceleration A1 plus the second acceleration A2 is conducted (second uniform-acceleration step).

When the acceleration-controlling operation is completed (When the predetermined controlling operation time terminates), the vibration of the feeder-driving system 50 has to be in a damped state as well as the acceleration of the feeder-driving system 50 has to return to zero. That is, so as to pair with the fourth-acceleration A4 that starts to be supplied at a timing of ceasing to accelerate, the third acceleration A3 having the volume starts to be supplied at the timing in order to generate the vibration V3 of the feeder-driving system 50 that can be damped by the vibration V4 of the feeder-driving system 50 that may be generated by starting to supply the fourth acceleration A4.

As the third acceleration A3 starts to be supplied, a vibrating force F3 is generated. Then, the vibration V3 is caused by the vibrating force F3.

After the third acceleration A3 has started to be supplied, a uniform-acceleration controlling operation of the first acceleration A1 plus the second acceleration A2 plus the third acceleration A3 is conducted (third uniform-acceleration step). Herein, A1>0, A2>0 and A3<0 are satisfied.

Then, the fourth acceleration A4 starts to be supplied. Then, a vibrating force F4 is generated, so that the vibration V4 is caused by the vibrating force F4. Thus, the vibration V3 accompanied with starting to supply the third acceleration A3 and the vibration V4 accompanied with starting to supply the fourth acceleration A4 are summed up in a relationship of opposite phase, so that amplitudes of the two vibrations are canceled out by each other. That is, a very effective vibration-damping effect can be achieved by a relationship of (V3+V4≈0).

According to the embodiment, as shown in FIG. 2, a good vibration-damped state can be achieved. There are vibrations of a half of the period corresponding to the natural frequency of the feeder-driving system 50 when acceleration-controlling operation is started and when acceleration-controlling operation is ceased, respectively. However, in the other time area, a substantially vibration-damped state can be maintained. In comparison with the conventional example shown in FIG. 3, it is easy to understand that the effectiveness of the embodiment is very remarkable.

As described above, according to the embodiment, the vibration V1 caused by the vibrating force F1 accompanied with starting to supply the first acceleration A1 is canceled out by the vibration V2 caused by the vibrating force F2 accompanied with starting to supply the second acceleration A2. Thus, the vibration is effectively damped down when starting to accelerate the feeder-driving system 50 based on the predetermined target condition.

In addition, the vibration V3 caused by the vibrating force F3 accompanied with starting to supply the third acceleration A3 is canceled out by the vibration V4 caused by the vibrating force F4 accompanied with starting to supply the fourth acceleration A4. Thus, the vibration is effectively damped down when ceasing to accelerate the feeder-driving system 50 based on the predetermined target condition.

In addition, regarding the starting-to-accelerate manner wherein the first acceleration and the second acceleration are paired with each other, if a plurality of such pairs of accelerations is combined, a rapid accelerating operation can be achieved while maintaining a vibration-damped state. Herein, as the vibration is damped by each pair of accelerations, different pairs of accelerations may have different volumes. Regarding the combining manner of the pairs of accelerations, the pairs can be combined not only independently (successively) but also overlappedly.

Similarly, regarding the ceasing-to-accelerate manner wherein the third acceleration and the fourth acceleration are paired with each other, if a plurality of such pairs of accelerations is combined, a rapid ceasing-to-accelerate operation can be achieved while maintaining a vibration-damped state. Herein, as the vibration is damped by each pair of accelerations, different pairs of accelerations may have different volumes. Regarding the combining manner of the pairs of accelerations, the pairs can be combined not only independently (successively) but also overlappedly.

Next, a second embodiment of the invention is explained with reference to FIGS. 4 and 5.

Figure 4:
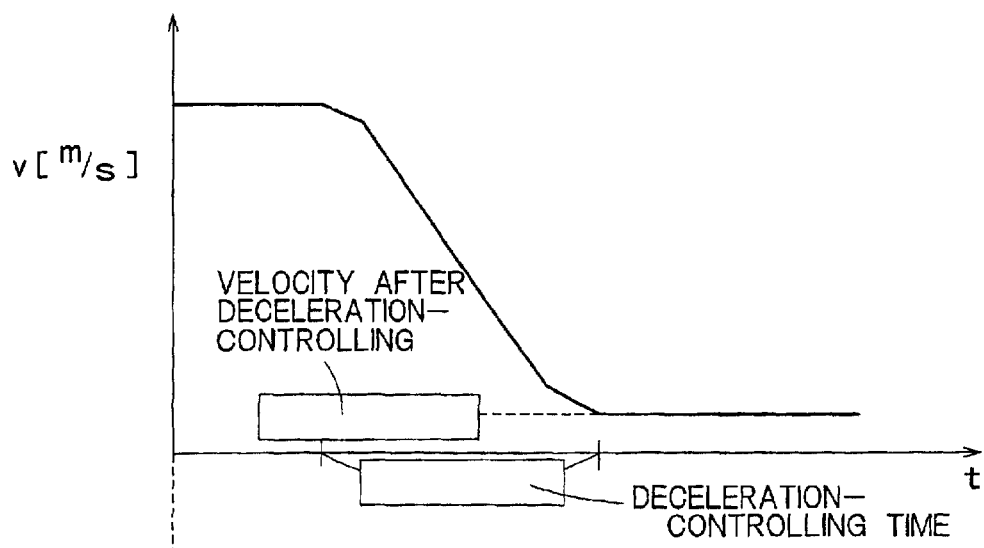
FIG. 4 shows a waveform of velocity, a waveform of acceleration and a waveform of vibration of a feeder-driving system that is decelerated by a numerical controlling unit according to a second embodiment of the invention.
Figure 4:
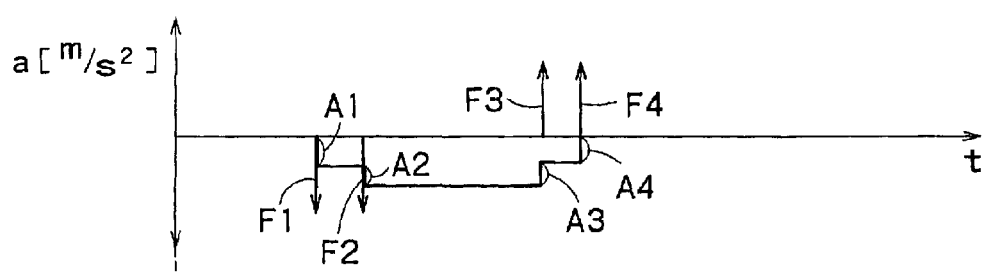
Figure 4:
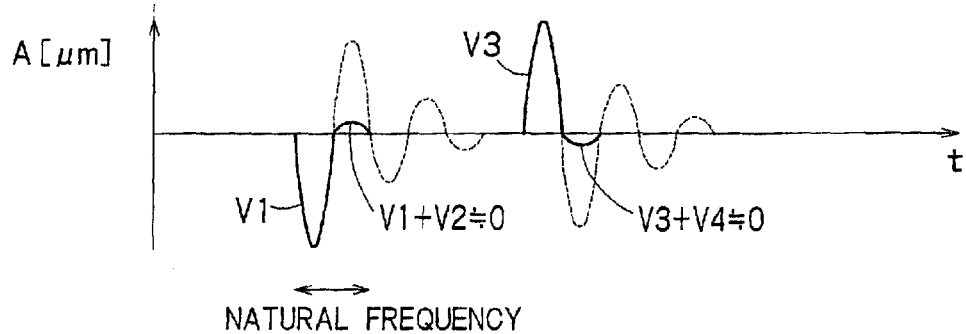

As shown in FIG. 4, the acceleration setting part 20 is adapted to set: a negative first acceleration A1 that starts to be supplied at a timing of starting to decelerate; and a negative second acceleration A2 that has a volume and that starts to be supplied overlappedly with the first acceleration A1 at a timing, the volume and the timing being determined so as to damp vibration V1 of the feeder-driving system 50 that is generated by starting to supply the first acceleration A1.

The timing at which the negative second acceleration A2 starts to be supplied, which is set by the acceleration setting part 20, is a moment wherein an amplitude of the vibration V1 of the feeder-driving system 50 generated by starting to supply the negative first acceleration A1 is raised and returns to zero at first. In addition, the volume of the second acceleration A2 is smaller than that of the first acceleration A1 by a slight volume, by taking into consideration being damped for a half of a period of the vibration V1.

In addition, the acceleration setting part 20 is adapted to further set: a fourth acceleration A4 (whose direction is opposite to the first acceleration A1 and the second acceleration A2) that starts to be supplied at a timing of ceasing to decelerate; and a third acceleration A3 (whose direction is opposite to the first acceleration A1 and the second acceleration A2) that has a volume and that starts to be supplied at a timing before supplying the fourth acceleration A4, the volume and the timing being determined so as to generate vibration V3 of the feeder-driving system 50 that can be damped by vibration V4 of the feeder-driving system 50 generated by starting to supply the fourth acceleration A4 overlappedly with the third acceleration A3.

Herein, the timing at which the fourth acceleration A4 starts to be supplied, which is set by the acceleration setting part 20, is a moment wherein an amplitude of the vibration V3 of the feeder-driving system 50 caused by starting to supply the third acceleration A3 is lowered and returns to zero at first.

In addition, the volume of the fourth acceleration A4 is smaller than that of the third acceleration A3 by a slight volume, by taking into consideration being damped for a half of a period of the vibration V3.

The other components or structures of the second embodiment are substantially the same as the first embodiment shown in FIG. 1. Thus, the other components or structures of the second embodiment are represented by the same reference numerals as the first embodiment, and the detail explanation thereof is omitted.

Then, an operation of the second embodiment is explained with reference to FIGS. 4 and 5. FIG. 4 shows a waveform of velocity, a waveform of acceleration and a waveform of vibration of the feeder-driving system 50 that is decelerated by the numerical controlling unit of the second embodiment. For a purpose of comparison, FIG. 5 shows a waveform of velocity, a waveform of acceleration and a waveform of vibration of the feeder-driving system 50 that is decelerated based on a conventional one-step uniform-acceleration control.

At first, before conducting an acceleration or deceleration controlling operation, a natural frequency of the feeder-driving system 50 is obtained and stored in the storing part 21. The natural frequency may be obtained by a calculation or by an actual measurement.

Then, the timing determining part 22 determines respective timings at which the respective accelerations A1 to A4 start to be supplied, based on the time for which a deceleration-controlling operation is conducted, which is a predetermined target condition, and based on the obtained natural frequency of the feeder-driving system 50.

In addition, the acceleration setting part 20 sets respective volumes of the respective accelerations A1 to A4, based on the velocity after the deceleration-controlling operation is completed, which is a predetermined target condition, and/or based on another condition.

After that, the accelerations set by the acceleration setting part 20 are supplied to the feeder-driving system 50 by the controlling part 30.

In detail, as shown in FIG. 4, when starting to decelerate the feeder-driving system 50, the first acceleration A1 is supplied (first uniform-acceleration step). At that time, a vibrating force F1 is generated, so that the vibration V1 is caused by the vibrating force F1.

At the moment wherein an amplitude of the vibration V1 of the feeder-driving system 50 generated by starting to supply the first acceleration A1 is raised and returns to zero at first, the second acceleration A2 starts to be supplied. The second acceleration A2 is supplied overlappedly with the first acceleration A1. At that time, a vibrating force F2 is generated, so that the vibration V2 is caused by the vibrating force F2.

As the second acceleration A2 is supplied, the vibration V1 accompanied with starting to supply the first acceleration A1 and the vibration V2 accompanied with starting to supply the second acceleration A2 are summed up in a relationship of opposite phase, so that amplitudes of the two vibrations are canceled out by each other. That is, a very effective vibration-damping effect can be achieved by a relationship of (V1+V2≈0).

After the second acceleration A2 has started to be supplied, a uniform-acceleration controlling operation of the first acceleration A1 plus the second acceleration A2 is conducted (second uniform-acceleration step).

When the deceleration-controlling operation is completed (When the predetermined controlling operation time terminates), the vibration of the feeder-driving system 50 has to be in a damped state as well as the acceleration of the feeder-driving system 50 has to return to zero. That is, so as to pair with the fourth acceleration A4 that starts to be supplied at a timing of ceasing to decelerate, the third acceleration A3 having the volume starts to be supplied at the timing in order to generate the vibration V3 of the feeder-driving system 50 that can be damped by the vibration V4 of the feeder-driving system 50 that may be generated by starting to supply the fourth acceleration A4.

As the third acceleration A3 starts to be supplied, a vibrating force F3 is generated. Then, the vibration V3 is caused by the vibrating force F3.

After the third acceleration A3 has started to be supplied, a uniform-acceleration controlling operation of the first acceleration A1 plus the second acceleration A2 plus the third acceleration A3 is conducted (third uniform-acceleration step). Herein, A1<0, A2<0 and A3>0 are satisfied.

Then, the fourth acceleration A4 starts to be supplied. Then, a vibrating force F4 is generated, so that the vibration V4 is caused by the vibrating force F4. Thus, the vibration V3 accompanied with starting to supply the third acceleration A3 and the vibration V4 accompanied with starting to supply the fourth acceleration A4 are summed up in a relationship of opposite phase, so that amplitudes of the two vibrations are canceled out by each other. That is, a very effective vibration-damping effect can be achieved by a relationship of (V3+V4≈0).

According to the embodiment, as shown in FIG. 4, a good vibration-damped state can be achieved. There are vibrations of a half of the period corresponding to the natural frequency of the feeder-driving system 50 when deceleration-controlling operation is started and when deceleration-controlling operation is ceased, respectively. However, in the other time area, a substantially vibration-damped state can be maintained. In comparison with the conventional example shown in FIG. 5, it is easy to understand that the effectiveness of the embodiment is very remarkable.

As described above, according to the embodiment, the vibration V1 caused by the vibrating force F1 accompanied with starting to supply the first acceleration A1 is canceled out by the vibration V2 caused by the vibrating force F2 accompanied with starting to supply the second acceleration A2. Thus, the vibration is effectively damped down when starting to decelerate the feeder-driving system 50 based on the predetermined target condition.

In addition, the vibration V3 caused by the vibrating force F3 accompanied with starting to supply the third acceleration A3 is canceled out by the vibration V4 caused by the vibrating force F4 accompanied with starting to supply the fourth acceleration A4. Thus, the vibration is effectively damped down when ceasing to decelerate the feeder-driving system 50 based on the predetermined target condition.

In addition, regarding the starting-to-decelerate manner wherein the first acceleration and the second acceleration are paired with each other, if a plurality of such pairs of accelerations is combined, a rapid decelerating operation can be achieved while maintaining a vibration-damped state. Herein, as the vibration is damped by each pair of accelerations, different pairs of accelerations may have different volumes. Regarding the combining manner of the pairs of accelerations, the pairs can be combined not only independently (successively) but also overlappedly.

Similarly, regarding the ceasing-to-decelerate manner wherein the third acceleration and the fourth acceleration are paired with each other, if a plurality of such pairs of accelerations is combined, a rapid ceasing-to-decelerate operation can be achieved while maintaining a vibration-damped state. Herein, as the vibration is damped by each pair of accelerations, different pairs of accelerations may have different volumes. Regarding the combining manner of the pairs of accelerations, the pairs can be combined not only independently (successively) but also overlappedly.

What is claimed is:

1. A numerical controlling unit that accelerates or decelerates a feeder-driving system, comprising:

an acceleration setting part that can set a volume and a timing of an acceleration that should be supplied to the feeder-driving system, based on a predetermined target condition, and a controlling part that can supply the acceleration set by the acceleration setting part to the feeder-driving system, wherein the acceleration setting part is adapted to set a first acceleration having a fist value that starts to be supplied at a first timing of starting to accelerate, and a second acceleration that has a second volume and that starts to be supplied at a second timing while the first acceleration is being supplied, the second value and the second timing being determined so as to damp vibration of the feeder-driving system that is generated by starting to supply the first acceleration, wherein:

the second timing at which the second acceleration starts to be supplied is a moment wherein an amplitude of the vibration of the feeder-driving system caused by the first acceleration is lowered to zero.

2. A numerical controlling unit according to the claim 1, wherein:

the vibration of the feeder-driving system is generated based on a natural frequency of the feeder-driving system, and the acceleration setting part has a storing part that can store a natural frequency of the feeder-driving system, and a timing determining part that can determine the second timing at which the second acceleration starts to be supplied based on the natural frequency of the feeder-driving system.

3. A numerical controlling unit according to the claim 2, wherein:

the acceleration setting part further has a calculating part that can calculate a natural frequency of the feeder-driving system based on rigidity of the feeder-driving system and a feeder-part weight of the feeder-driving system.

4. A numerical controlling unit that accelerates or decelerates a feeder-driving system, comprising:

an acceleration setting part that can set a value and a timing of an acceleration that should be supplied to the feeder-driving system, based on a predetermined target condition, and a controlling part that can supply the acceleration set by the acceleration setting part to the feeder-driving system, wherein the acceleration setting part is adapted to set a first acceleration having a first value that starts to be supplied at a first timing of starting to accelerate, and a second acceleration that has a second volume and that starts to be supplied at a second timing while the first acceleration is being supplied, the second value and the second timing being determined so as to damp vibration of the feeder-driving system that is generated by starting to supply the first acceleration, wherein:

the acceleration setting part is adapted to further set a fourth acceleration that starts to be supplied at a fourth timing of ceasing to accelerate, and a third acceleration that has a third value and that starts to be supplied at a third timing before supplying the fourth acceleration, the third value and the third timing being determined so as to generate vibration of the feeder-driving system that is damped by starting to supply the fourth acceleration while the third acceleration is being supplied.

5. A numerical controlling unit that accelerates or decelerates a feeder-driving system, comprising:

an acceleration setting part that can set a value and a timing of an acceleration that should be supplied to the feeder-driving system, based on a predetermined target condition, and a controlling part that can supply the acceleration set by the acceleration setting part to the feeder-driving system, wherein the acceleration setting part is adapted to set a first acceleration having a first value that starts to be supplied at a first timing of starting to decelerate, and a second acceleration that has a second volume and that starts to be supplied at a second timing while the first acceleration is being supplied, the second value and the second timing being determined so as to damp vibration of the feeder-driving system that is generated by starting to supply the first acceleration, wherein:

the second timing at which the second acceleration starts to be supplied is a moment wherein an amplitude of the vibration of the feeder-driving system caused by the first acceleration is raised to zero.

6. A numerical controlling unit according to the claim 5, wherein:

the vibration of the feeder-driving system is generated based on a natural frequency of the feeder-driving system, and the acceleration setting part has a storing part that can store a natural frequency of the feeder-driving system, and a timing determining part that can determine the second timing at which the second acceleration starts to be supplied based on the natural frequency of the feeder-driving system.

7. A numerical controlling unit according to the claim 6, wherein:

the acceleration setting part further has a calculating part that can calculate a natural frequency of the feeder-driving system based on rigidity of the feeder-driving system and a feeder-part weight of the feeder-driving system.

8. A numerical controlling unit that accelerates or decelerates a feeder-driving system, comprising:

an acceleration setting part that can set a value and a timing of an acceleration that should be supplied to the feeder-driving system, based on a predetermined target condition, and a controlling part that can supply the acceleration set by the acceleration setting part to the feeder-driving system, wherein the acceleration setting part is adapted to set a first acceleration having a first value that starts to be supplied at a first timing of starting to decelerate, and a second acceleration that has a second value and that starts to be supplied at a second timing while the first acceleration is being supplied, the second value and the second timing being determined so as to damp vibration of the feeder-driving system that is generated by starting to supply the first acceleration, wherein:

the acceleration setting part is adapted to further set a fourth acceleration that starts to be supplied at a fourth timing of ceasing to decelerate, and a third acceleration that has a third value and that starts to be supplied at a third timing before supplying the fourth acceleration, the third value and the third timing being determined so as to generate vibration of the feeder-driving system that is damped by starting to supply the fourth acceleration while the third acceleration is being supplied.

* * * * *

UNITED STATES PATENT AND TRADEMARK OFFICE
CERTIFICATE OF CORRECTION

PATENT NO.   : 6,823,233 B2
DATED        : November 23, 2004
INVENTOR(S)  : Ichiro Matsumoto et al.

It is certified that error appears in the above-identified patent and that said Letters Patent is hereby corrected as shown below:

<u>Title page,</u>
Item [56], References Cited, U.S. PATENT DOCUMENTS, please add these inadvertantly omitted references:
-- 4,555,758 *  11/1985  Inaba et al.
   4,603,286 *  07/1986  Sakano
   5,911,125 *  06/1999  Fujibayashi et al.
   6,484,109 *  11/2002  Lofall --

Signed and Sealed this

Fifth Day of April, 2005

JON W. DUDAS
*Director of the United States Patent and Trademark Office*